United States Patent Office 3,207,481
Patented Sept. 21, 1965

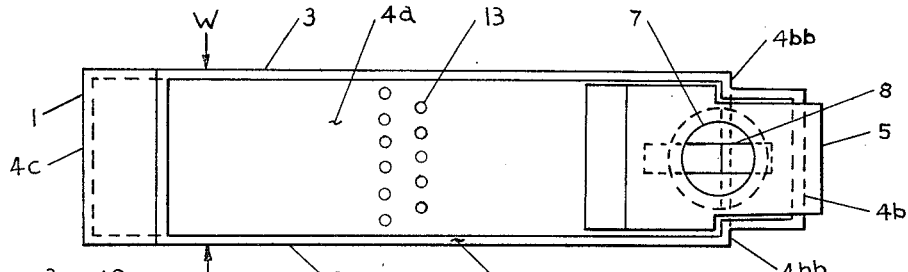
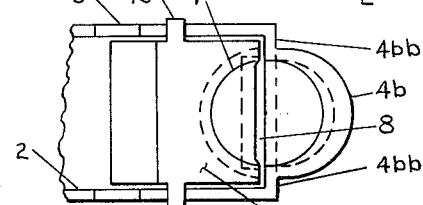
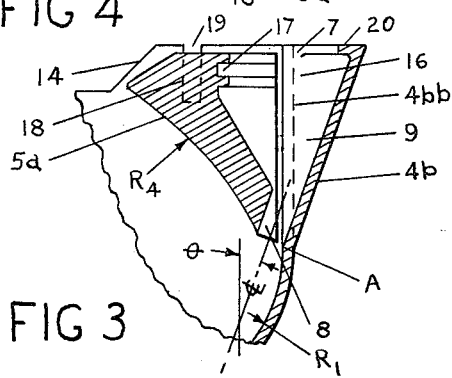
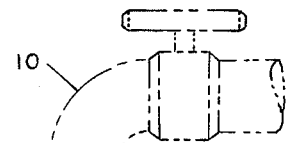
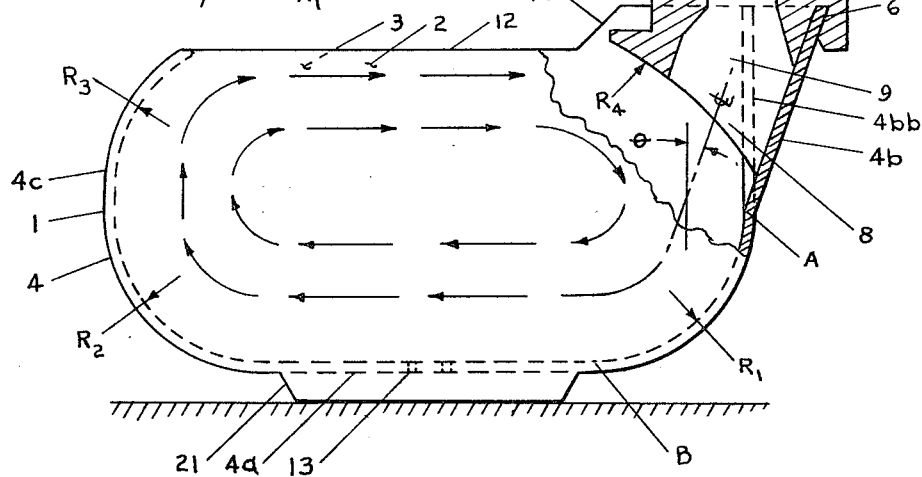

3,207,481
FRUIT AND VEGETABLE WASHING DEVICE WITH VERTICAL CIRCULATIVE FLOW AND SLANTED INLET
Charles W. Ranson, 7906 Agnew Ave., Los Angeles 45, Calif.
Filed Dec. 10, 1962, Ser. No. 243,547
9 Claims. (Cl. 259—4)

The present invention relates to a washing device for fruits and vegetables and other solid food units. The device provides for imparting to contained liquid a two dimensional circulative flow in a vertical plane. Provision is included for the circulative liquid flow to receive sufficient kinetic energy from tangential inlet liquid flow to effect continuous vertical circulative motion of the fruits or vegetables.

Objects of the invention are to provide for the thorough cleaning of all surface areas of fruits and vegetables in minimum time and without bruises or damage.

Other objects are to provide a simple cleaning device having no moving mechanical parts, and which can be used conveniently in household kitchen sinks, and which can utilize kinetic energy available from conventional household faucet water.

Another object is to provide for cleaning a larger load of fruits or vegetables in a given size of washing device than was previously possible using a fixed water faucet pressure.

An additional object is to provide for consistency in the amount of water pressure required for starting circulative motion of a static load of food units.

Another object is to reduce the amount of water pressure required for starting circulative motion of a given size static load of food units.

Another object is to reduce the jamming or stalling tendency of a bulk of food units undergoing circulative motion with the liquid mass.

A number of other objects and advantages will become apparent as the description proceeds.

One form of the present invention is illustrated in the accompanying drawings wherein similar numerals refer to similar parts throughout the views.

FIGURE 1 is a side view of the fruit and vegetable washing device properly positioned beneath an open water faucet. The arrows indicate the flow path of the circulative liquid flow.

FIGURE 2 is a plan view of FIGURE 1 showing the comparatively narrow width of the washing device.

FIGURE 3 is a fragmentary view of a portion of FIGURE 1 showing a variation of the liquid inlet unit.

FIGURE 4 is a plan view of FIGURE 3.

The washing of fruits and vegetables in the kitchen has heretofore been accomplished by the use of a colander, a conventional kitchen pan, or by hand rubbing under an open faucet.

The colander is a bowl-shaped sieve with a base. For food washing purposes, the colander is held under an open faucet while containing a pile of food units. The bulk of the water follows the path of least resistance and flows around rather than through the pile of food units. The velocity of the water seeping between the food units is low due to resistance so that liquid scouring and dissolving action is relatively inefficient and slow. Also the food units lie static so that areas of mutual contact and areas of contact with the container receive no washing.

The conventional kitchen pan is generally used for washing by filling the bottom of the pan with food units and most of the remainder with water. The pan is then shaken by hand to simulate the action of a tumbling barrel. The cleaning action is highly erratic and inconsistent. Rinsing is only partial as the liquid is poured out. Bruises and surface damage can be done to berries and delicate skin fruits by the shifting weight of the total load.

The prior art has also provided a washing device of the type described herein. This device is described in my copending application Serial No. 465,822, effective filing date Dec. 3, 1962. Said prior device provides distinct improvements. However, it has been found desirable to provide even greater improvements in load capacity and operating performance as subsequently described herein.

The present invention improves upon the prior devices and provides advantages as set forth by the above statements of objectives.

Referring to the several figures, washing device 1 is comprised of side walls 2 and 3 extending longitudinally and vertically and spaced apart in relative proximity. A lateral wall 4 extends between side walls 2 and 3 to provide a bottom wall 4a and two opposite end walls 4b and 4c. The bottom wall 4a and end wall 4b are faired together by radius $R_1$ to provide a curved inner surface as shown.

End wall 4b extends upwardly slanted to vertical but includes vertical end wall edge portions 4bb as shown in the several figures. Thus end wall 4b is the bottom, and edge portions 4bb are the upper flanges of a channel.

The inner surfaces of end wall edge portions 4bb extend vertically above point A, which is the point of tangency with radius $R_1$. Point B indicates the lower point of tangency with radius $R_1$. Other portions of lateral wall 4 are curved and faired as indicated by radius $R_2$ and radius $R_3$. The internal surface of lateral wall 4 provides a smooth, curved perimeter flow path for contained liquid.

As shown in FIGURE 1, washing device 1 includes a liquid inlet portion or unit 5 which clips to end wall 4b by notch 6 in the inlet unit. Inlet unit 5 includes an upper admission port 7, a normally submerged exit port 8, and an interconnecting vertical duct portion 9. Admission port 7 is circular and exit port 8 is rectangular in transverse cross section, and duct portion 9 provides a gradual transition in cross-sectional shapes. Duct portion 9 of inlet unit 5 is immediately adjacent to end wall 4b to provide maximum influence in energizing the liquid at the periphery of the contained liquid bulk. The circulative motion of the peripheral fluid is then transmitted to the remainder of the fluid by the viscous effects of the liquid.

For operation, the device is partially filled with fruits or vegetables or other food units and placed under an open faucet 10. Device 1 is positioned so that the water jet enters port 7 of inlet portion or unit 5. The water may enter as a free jet, FIGURE 1, or as a captive flow through a conduit. The water jet passes through inlet unit 5 and exits at port 8 entering the container portion of the washing device. The water jet enters adjacent to end wall 4b, passes tangent point A and is guided by the surface at $R_1$ into a circulative path. The liquid is further directed into a circulative path by the surfaces at $R_2$ and $R_3$ as well as the curved surface $R_4$ of the inlet unit. The established flow path is in accordance with the arrows shown in FIGURE 1. The liquid major exhaust occurs as overflow along the length of upper perimeter 12. Auxiliary exhaust ports 13 in bottom lateral wall 4a provide for the continuous exhausting of small liquid jets to remove sand and solid particles.

Washing device 1 contains liquid vertically within a width W of relatively narrow proportions as shown in FIGURE 2. This lateral confinement provides for two dimensional liquid flow in a vertical plane. The circulative flow pattern is induced by the substantially tangential inlet jet and the curved inner surfaces of the lateral wall, FIGURE 1. Two dimensional confinement contributes greatly to liquid flow control and reduces dissipation of kinetic energy from lateral flow and turbulence.

As stated previously, the side walls 2 and 3 are in the state of being mutually near. This side wall proximity endows the washing device with a width less than the length or height of each. The device has been found to be operable using conventional household faucets and a reasonable container volume when width W is about one half or less of the length or height of the device. As the width of the device is decreased with respect to the length or height, the efficiency and load capacity increases. When the width of the device is relatively large with respect to the length or height the circulative two dimensional flow pattern is not obtained, but localized random liquid agitation occurs at the region of faucet water entry. This results in erratic and negligible washing action. The specific side wall proximity required for satisfactory performance of any given installation depends upon a number of variables including the liquid mass flow rate, the height and length of the device, the internal contours of the device, the density and dimensions of the food units to be cleaned, and the size of the wash load.

The kinetic energy of the inlet jet is conserved by the relatively large proportions of radii $R_1$, $R_2$, $R_3$ nd $R_4$, and by the substantially two dimensional liquid flow pattern. The overflow liquid is of low velocity and low kinetic energy loss. Viscosity functions to maintain the entire liquid body in a state of circulative flow.

The two dimensional circulative liquid flow in a vertical plane imparts similar circulative motion to contained food units. The submerged food units are buoyed by forces equal to the weights of the displaced liquid. Consequently, only a relatively small amount of liquid drag force is required to lift a given food unit vertically against the gravity force. The drag force of a solid body in non-laminar liquid flow is proportioned to the relative velocity squared. Hence, by constructing washing device 1 as described, to conserve kinetic energy and to maintain high liquid rotative velocity, the food units are forced to rise and circulate with the liquid. Food unit circulative washing has been achieved using the water jet from conventional household faucets. It was found that the food units experience local tumbling as they move in general circulative flow. This tumbling action adds to the liquid scouring effect and to the cleaning by mutual attrition between food units.

During operation of the washing device, insecticides, fungicides and other chemicals and soil particles are progressively removed from food units by a continuously diluting liquid flow. The impurities are carried away in the bulk liquid overflow along perimeter 12. The length of the perimeter is relatively long to provide a small liquid overflow rate per unit length of weir. This reduces or prevents the loss overboard of food units as they circulate with the circulative liquid flow. Heavier non-soluble impurities are discharged through auxiliary exhaust ports 13 as the impurities are swept by liquid along the surface of bottom wall 4a. Ports 13, by the removal of the liquid boundary layer, retard the formation of turbulence and improve efficiency by conserving kinetic energy of the main liquid circulative flow. When faucet 10 is closed, liquid drainage occurs automatically through ports 13 permitting food units conveniently to be poured from the central channel of spout 14 without liquid.

The present washing device is an improvement over my prior device, previously referenced, by the addition of the slant from vertical of duct portion 9 and exit port portion 8. This is indicated in FIGURE 1 by the angle $\theta$ showing the slant of the center line of the lower duct portions of inlet unit 5 with respect to a vertical reference line. In the prior referenced device the angle $\theta$ was equal to zero.

For some combinations of container size, amount of water pressure available, and size of static load of a given type of food units and faucet size the prior configuration with $\theta$ equal to zero was found to be satisfactory by testing. For some other combinations performance of the prior configuration was found to be less satisfactory. A point was reached while varying the parameters wherein there was insufficient kinetic energy for the food and water mass to revolve. At this point the washing device stalls and the food units settle on the bottom in a pile. However, an angle $\theta$ of about seventeen degrees plus or minus ten degrees allows operation with a larger number of food units before stall occurs. Conversely, a slant inlet allows the same size load to be cleaned with a lower water pressure. Inlet portion or unit 5 with a slanted duct and exit port directs the inlet water jet 15 into the circulative contained water flow at an angle. In starting up the device with a static food pile in the lower part of the device, the inlet angle is such that the inlet jet impinges more than previously upon the static pile of food units. This impinging jet fills the entire device with water and then erodes the food pile rapidly causing individual food units to lift way from the pile. This facilitates the task of accelerating the entire liquid and food unit mass into a state of steady circulative motion. Heretofore, starting performance had been somewhat erratic in various tests when $\theta$ was zero degrees. The introduction of an inlet angle of about seventeen degrees provided not only a required lower starting torque but provided consistent test results over a large number of tests. Also, once circulation was established it was observed that there was a reduced jamming or stalling tendency of the food units.

In operation, inlet unit 5 is placed approximately in line with faucet 10 to receive faucet jet 15. Anti-splash chamber 16 is provided with annular grooves 17 to deflect splashed inlet liquid, and to accommodate an extension conduit for direct faucet attachment if desired.

The configuration of FIGURES 3 and 4 is modified from that of FIGURES 1 and 2. In FIGURES 1 and 2 elongated exit port 8 is perpendicular to end wall 4b, whereas in FIGURES 3 and 4 elongated exit port 8 is substantially parallel to end wall 4b. In FIGURES 3 and 4 inlet unit 5a cooperates with end wall 4b to provide duct portion 9, upper admission port 7, and lower exit port 8. Inlet unit 5a is held in place by ears 18 which engage slots 19 of side walls 2 and 3. Lip 20 of end wall 4b cooperates with annular grooves 17 of inlet unit 5a to reduce liquid splashing or as an option to engage an extension conduit for direct attachment to faucet 10. Admission port 7 is circular in cross section and exit port 8 is rectangular in cross section, so that duct portion 9 provides a gradual transition in cross-sectional shapes. The modified configuration allows differences in design, performance, and fabrication methods.

Inlet unit or portion 5 may be separable from washing device 1, or the inlet portion may be bonded or otherwise integrally associated with the washing device within the scope of the invention. Similarly, the inlet portion or unit may be separable into sections which combine in use to perform as described.

The washing device rests on parallel skids 21 to provide elevation clearance for exhaust ports 13.

While one embodiment of the present invention has been illustrated it is to be understood that what is defined by Letters Patent is specified by the appended claims.

What is claimed is:

1. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and a liquid inlet portion normally positioned substantially above said curved inner surface and substantially adjacent to said end wall, said inlet portion providing an approximately vertically extending duct portion having an upper admission port portion open upwardly to the atmosphere and a lower normally submerged exit port portion, and said exit port portion slanted from vertical in a direction down and inwardly, and means for supporting said inlet portion with respect to said washing device.

2. A washing device and liquid inlet portion as in claim 1, and said exit port portion having a liquid discharge direction effectively tangential to said substantially curved inner surface.

3. A washing device and liquid inlet portion as in claim 1, and said inlet portion having a downwardly slanted lower surface to normally guide circulating liquid within said device in a curved path.

4. A washing device and liquid inlet portion as in claim 1, and said duct portion of said inlet portion having enlarged cross-sectional areas upwardly to provide an anti-splash chamber.

5. A washing device and liquid inlet portion as in claim 1, and said end wall cooperating with said approximately vertically extending duct portion of said inlet portion to provide an integral duct.

6. A washing device and liquid inlet portion as in claim 1, and said exit port portion having elongated transverse duct cross sections.

7. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and a liquid inlet portion substantially above said curved inner surface and substantially adjacent to said end wall, said inlet portion providing an approximately vertically extending duct portion having an upper admission port portion and a lower normally submerged exit port portion, and said exit port portion slanted seventeen degrees from vertical plus or minus ten degrees approximately in a direction down and inward, and means for supporting said inlet portion with respect to said washing device.

8. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and said faired end wall shaped internally in concave form in horizontal cross sections to provide a substantially vertically extending channel portion of said end wall and a liquid inlet portion normally positioned above said curved inner surface and adjacent to said faired end wall, and said inlet portion including a substantially verticaly extending duct portion having an upper admission port portion and a lower normally submerged exit port portion, and said exit port portion slanted from vertical in a direction down and inward, and means for supporting said inlet portion to said washing device.

9. A washing device comprising two side walls extending longitudinally and vertically and spaced apart, a lateral wall extending between said side walls to provide a bottom wall and two opposite end walls and connecting with said side walls in unitary relation to provide a container cavity, and the inner surface of said bottom wall and the inner surface of at least one of said end walls substantially faired to provide a substantially curved inner surface at the region of juncture, and said spaced side walls separated a distance less than one half of the largest single dimension of the container cavity in the direction of length or height, and a liquid inlet portion normally positioned substantially above said curved inner surface, and said inlet portion providing an approximately vertically extending duct portion having an upper admission port portion and a lower normally submerged exit port portion, and said duct portion substantially within said container cavity and within upward projections of said side walls and end walls normally, and said exit port portion slanted from vertical in a direction down and inwardly, and means for supporting said inlet portion with respect to said washing device.

References Cited by the Examiner

UNITED STATES PATENTS

| | | | |
|---|---|---|---|
| 577,362 | 2/97 | Ettlinger | 239—592 X |
| 1,053,223 | 2/13 | Robertson | 95—97 |
| 1,245,768 | 11/17 | Randall | 259—36 |
| 1,262,962 | 4/18 | Lewis. | |
| 1,382,992 | 6/21 | Lombard | 68—184 |
| 1,383,885 | 7/21 | Webb | 251—118 X |
| 1,521,390 | 12/24 | Reynolds. | |
| 1,663,382 | 3/28 | Merkel | 251—118 X |
| 1,775,554 | 9/30 | Dehle | 68—184 |
| 2,516,950 | 8/50 | Kyame | 259—95 X |
| 2,760,368 | 8/56 | Norton | 134—198 X |
| 2,938,368 | 5/60 | Bixel | 134—138 X |

FOREIGN PATENTS

| | | |
|---|---|---|
| 546,571 | 7/56 | Italy. |
| 587,859 | 1/59 | Italy. |
| 151,950 | 4/32 | Switzerland. |
| 206,355 | 7/39 | Switzerland. |

CHARLES A. WILLMUTH, *Primary Examiner.*

GEORGE J. NORTH, *Examiner.*